(12) United States Patent
Groh et al.

(10) Patent No.: US 6,668,760 B2
(45) Date of Patent: Dec. 30, 2003

(54) SPRAY CONTROL ANTI-BARK COLLAR

(75) Inventors: William S. Groh, Knoxville, TN (US); Albert L. Lee, IV., Maryville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 10/079,216

(22) Filed: Feb. 20, 2002

(65) Prior Publication Data

US 2003/0154929 A1 Aug. 21, 2003

(51) Int. Cl.[7] ........................ A01K 15/02; A01K 15/04
(52) U.S. Cl. ..................... 119/718; 119/719; 119/905
(58) Field of Search ........................ 119/712, 718, 119/719, 905, 908

(56) References Cited

U.S. PATENT DOCUMENTS

| 4,627,385 | A | | 12/1986 | Vinci |
| 5,009,192 | A | | 4/1991 | Burman |
| 5,046,453 | A | | 9/1991 | Vinci |
| 5,501,179 | A | | 3/1996 | Cory |
| 5,566,645 | A | | 10/1996 | Cole |
| 5,603,287 | A | | 2/1997 | Houck |
| 5,868,103 | A | * | 2/1999 | Boyd ........................ 119/719 |
| 5,927,233 | A | * | 7/1999 | Mainini et al. ............ 119/718 |
| 6,016,100 | A | * | 1/2000 | Boyd et al. ............... 119/719 |
| 6,116,192 | A | * | 9/2000 | Hultine et al. ............ 119/719 |
| 6,431,121 | B1 | * | 8/2002 | Mainini et al. ............ 119/718 |

* cited by examiner

Primary Examiner—Charles T. Jordan
Assistant Examiner—Elizabeth Shaw
(74) Attorney, Agent, or Firm—Pitts & Brittian, P.C.

(57) ABSTRACT

An apparatus for controlling the barking of a dog through application of a spray deterrent, or spray control bark collar. The spray control bark collar administers a dose of a pressurized substance in response to the barking of the dog. The spray control bark collar detects the barking of the dog through the measuring of vibrations produced by the dog. In addition, the spray control bark collar delivers successively larger doses of the spray deterrent to the dog to deter the dog from further barking should the dog fail to respond to previous deterrent attempts. Finally, the spray control bark collar monitors the usage of the spray deterrents to gauge the amount of the deterrent substance remaining in the deterrent substance reservoir.

20 Claims, 5 Drawing Sheets

SPRAY CONTROL ANTI-BARK COLLAR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Scope of Invention

This invention relates to the field an apparatus for controlling the barking of pet dogs. More specifically, the present invention relates to a device that senses the target dog's bark using vibration detector and applies a stimulus targeted to a dog's olfactory senses to deter the dog from barking.

2. Description of the Related Art

Most pet owners know the problems associated with controlling the barking of a pet dog. Dogs naturally bark for many reasons such as to signal other dogs, to define their territory, to communicate excitement or fear and to warn prior to an attack.

Where dogs are kept on large tracts of land, such as farms, the barking of a dog is generally not considered a nuisance. Instead, it may be regarded as a signal of an event requiring the attention of the landowner, for example, a person approaching or a strange animal in the area. However, where a dog owner lives in an area closely proximate to other people, the barking of a dog can become a nuisance to both the dog owner and the neighbors.

Various techniques have been developed to control the barking of a dog. First, the bark of a dog can be controlled surgically by the removal of the larynx. However, this solution is usually unacceptable to the pet owner as unnecessarily cruel and expensive. Second, standard obedience techniques can be used to train the dog to not bark, but this is time consuming and often requires the presence of the owner to correct the dog. If the owner is absent from the home for long periods of time, such as at work, the dog may learn to not bark only when the owner is present, remaining a nuisance while the owner is away. Third, a muzzle can be utilized to prevent the dog from barking. However, the muzzle must be periodically removed to allow the dog to eat or drink. While unmuzzled, the dog is not constrained from barking. The need for supervision prevents use of a muzzle for extended periods of time. Further, the intermittent bark control associated with the periodic removal of the muzzle, necessitated by feeding, provides opportunity for the barking to present a nuisance. Finally, remote and automatic systems using various trigger mechanisms have been developed to control the barking of a dog.

BRIEF SUMMARY OF THE INVENTION

An apparatus for controlling the barking of a dog through application of a spray deterrent, or spray control bark collar is shown and described. The spray control bark collar administers a dose of a substance capable of being sprayed in response to the barking of the dog. The spray control bark collar detects the barking of the dog through the measuring of vibrations produced by the dog. In addition, the spray control bark collar delivers successively larger doses of the spray deterrent to the dog to deter the dog from further barking should the dog fail to respond to previous deterrent attempts. Finally, the spray control bark collar monitors the usage of the spray deterrents to gauge the amount of the deterrent substance remaining in the deterrent substance reservoir.

The spray control bark collar includes a vibration sensor responsive to the bark of the dog. An amplifier amplifies the output of the vibration sensor to increase the level of the sensor output for further processing and accurate sampling. A processing device monitors the amplified output and activates the stimulus delivery mechanism as necessary. Decision-making logic within the processor determines whether a stimulus is needed. The stimulus delivery mechanism is a spray mechanism that delivers a controlled dose of a deterrent substance. The spray delivery mechanism includes a solenoid connecting a reservoir containing a deterrent substance, which is held under pressure, to a valve directing the deterrent spray at the olfactory senses of the dog.

The solenoid and valve assembly includes a bobbin, which houses the solenoid components. The bobbin further defines an axial through opening creating a volume for fluid transfer. A through opening is threaded at one end and receives a threaded valve. The valve includes a valve output connected to a discharge channel that opens to the internal volume of the bobbin. A plunger rests in the through opening below the valve. The plunger includes a seal configured to engage end of the discharge channel that opens to the interior volume of the bobbin. The seal is formed from a material that is flexible such that when the seal is brought into engagement with the valve, the discharge channel is effectively closed so that no fluid can escape through the valve. A spring biases the plunger to maintain the plunger in a closed position. To open the valve, the bias of the spring is overcome using the solenoid by passing current through the windings. This creates an electromagnetic field that pulls the plunger back against the stopper, thereby allowing the pressurized deterrent substance to enter the discharge channel and escape through the valve. The pressurized deterrent substance enters the volume of the bobbin through inlet, which is open to the reservoir.

The vibration sensor includes an exposed probe adapted to engage the throat of the dog and move in response to vibrations of the dog's vocal chords. The probe is mounted on a post that passes through an opening defined by the case. Inside the case, the post connects to a transverse member that is in engagement with a piezoelectric sensor. The vibration sensor is designed with a plurality of gaskets arranged to accomplish three goals. First, the outer gasket and the inner gasket serve to seal the case and protect the internal components of the spray control bark sensor from moisture and other environmental exposure where the post passes through the wall of the case. Next, the outer gasket and the inner gasket serve to isolate the vibration sensor from the case to reduce the detection of vibrations transferred through the case instead of the probe. Finally, the internal gasket is positioned between the case and the piezoelectric sensor to amplify the sensitivity of the piezoelectric sensor.

The spray control bark collar is designed to give the pet owner a warning when the deterrent reservoir is getting low before the reservoir becomes empty. Obviously, if the reservoir is empty, then the spray control bark collar does not serve as an effective deterrent. The general method involves resetting a counter when the reservoir is filled. As the deterrent is applied, a counter is incremented to keep track of either the number of or the total time of the application of the deterrent. The counter is monitored and when a threshold value is reached, a low reservoir warning is produced. The counter is reset by the activation of a refill switch when the reservoir is refilled.

The spray control bark collar includes a progressively increasing spray deterrent designed to discourage barking using the minimum amount of spray necessary to achieve the desired deterrent effect. Generally, the spray deterrent begins with a minimum dose of the substance applied to the dog in response to a bark. In the illustrated embodiment, the dosage is controlled by the duration the spray application. The processing device controls the timing and activates the solenoid for the desired spray duration.

BRIEF DESCRIPTION OF THE SEVERAL VIEWS OF THE DRAWINGS

The above-mentioned features of the present invention will become more clearly understood from the following detailed description of the invention read together with the drawings in which.

DETAILED DESCRIPTION OF THE INVENTION

An apparatus for controlling the barking of a dog through application of a spray deterrent, or spray control bark collar, is illustrated generally at 10 in the figures. The spray control bark collar 10 administers a dose of a substance capable of being sprayed in response to the barking of the dog. The spray control bark collar 10 detects the barking of the dog through the measuring of vibrations produced by the dog. In addition, the spray control bark collar 10 delivers successively larger doses of the spray deterrent to the dog to deter the dog from further barking should the dog fail to respond to previous deterrent attempts. Finally, the spray control bark collar 10 monitors the usage of the spray deterrents to gauge the amount of the deterrent substance remaining in the deterrent substance reservoir.

Figure 1:
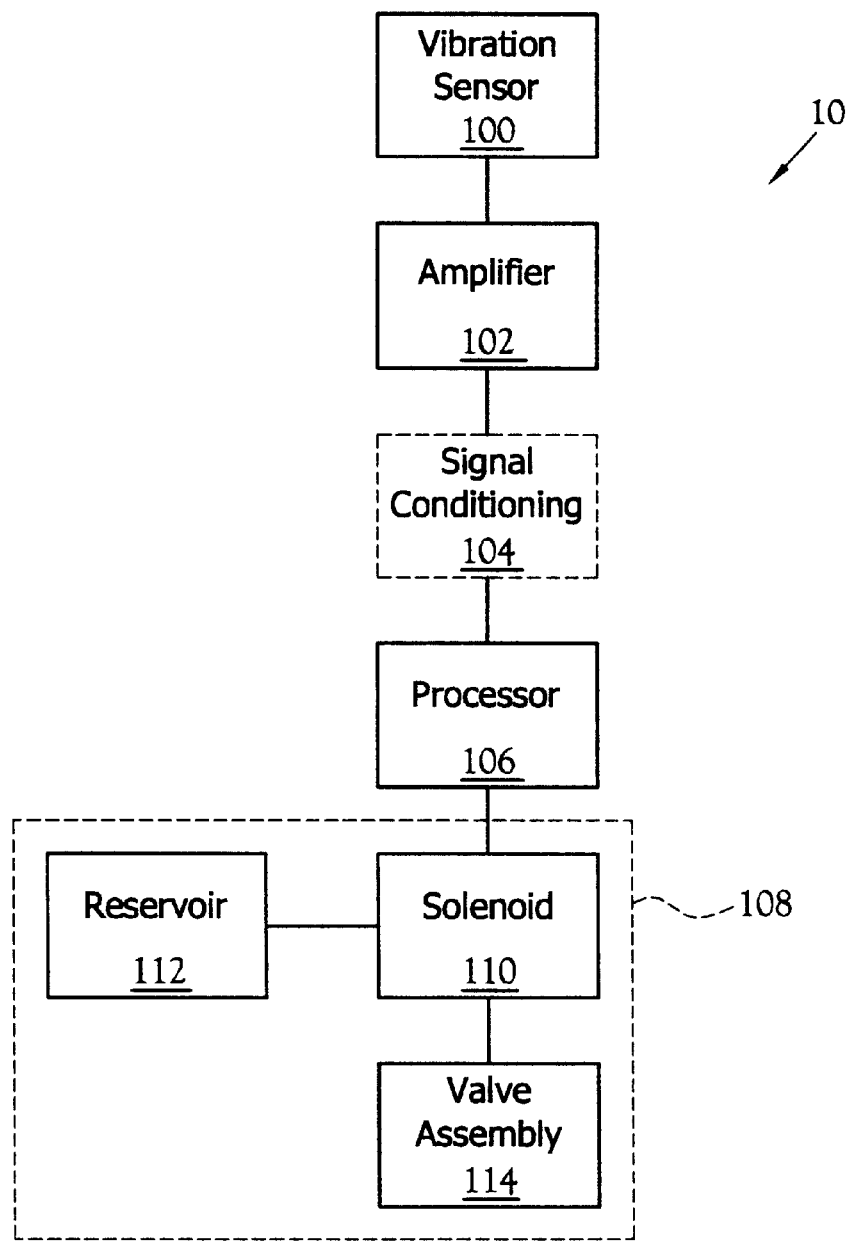
FIG. 1 illustrates a block diagram of the spray control bark collar of the present invention.

FIG. 1 illustrates a block diagram of the spray control bark collar 10. The apparatus includes a sensor 100 responsive to the bark of the dog. In one embodiment, the sensor 100 is a piezoelectric vibration sensor that is in contact with the dog for measuring vibrations produced by the dog. The piezoelectric sensor 100 is a low current device compared to other devices used for detecting the barking of a dog, such as a microphone. A low current device provides the spray control bark collar 10 with a longer battery life. The vibration sensor 100 is typically placed in contact with the throat of the dog so as to measure vibrations produced by the vocal cords of the dog. Due to the direct engagement of the vibration sensor 100 with the target dog and not ambient noise, the number of false corrections is reduced, i.e., inappropriate correction due to the barking of another nearby dog. An amplifier 102 amplifies the output of the vibration sensor 100 to increase the level of the sensor output for further processing and accurate sampling.

Depending upon the application and the desired level of sophistication of the bark detection circuit, the amplifier output may be processed to condition the signal by an optional signal conditioning circuit 104. The signal conditioning circuit 104 may also serve to discriminate among the vibrations measured by the vibration sensor 100 so as to pass only measured vibrations that meet specified criteria. For example, the signal conditioning circuit 104 may be configured to pass only those vibrations occurring within a specified frequency range or those meeting certain durational limits or may be configured to remove unwanted components of the sensor output. Those skilled in the art will recognize the various filters, amplifiers and other signal conditioning devices that can be used to prepare the measured vibrations for further processing. Those skilled in the art will recognize that the type of signal conditioning depends upon the input signal, the corresponding sensor and the desired characteristics of the input signal that are to be monitored. For example, the filter may be active or passive and may be set to pass a specific frequency range or remove high or low frequency noise. Further, depending upon the various components used, the output signal may not require additional amplification. Finally, other conditioning may be required to present a useable sensor output to the remainder of the circuit.

A controller or processing device 106 monitors the amplified output and activates the stimulus delivery mechanism 108 as necessary. Decision-making logic within the processor 106 determines whether a stimulus is needed. Typically, the input to the processor 106 is compared against a reference value to determine whether a stimulus is warranted. A conventional processing device includes an internal timer, memory registers and math capabilities allowing sophisticated signal processing to occur; however, those skilled in the art will recognize that these capabilities can be achieved using other components without departing from the spirit and scope of the present invention. Further, those skilled in the art will recognize that the components used to depend on various factors including the cost of manufacture, size and weight constraints and the complexity of the decision process. For example, the size and weight of the training collar worn by the animal is reduced by implementing the controller in a single application specific integrated circuit (ASIC) or a microprocessor, both of which allow complex decision making capabilities. For lower cost, larger units implementing a simple decision tree, an array of discrete logic components can be used.

In the illustrated embodiment, the stimulus delivery mechanism 108 is a spray mechanism that delivers a controlled dose of a deterrent substance, or fluid. The spray delivery mechanism 108 includes a solenoid 110 connecting a reservoir 112 containing a deterrent substance, which is held under pressure, to a valve 114 directing the deterrent spray at the olfactory senses of the dog. The deterrent substance is selected to be irritating or disturbing to the dog. A commonly used deterrent stimulus is a citronella liquid; however, those skilled in the art will recognize other deterrent substances that can be used without departing from the scope and spirit of the present invention, for example compressed air or water. In addition, those skilled in the art will recognize that the sound of the substance escaping under pressure provides a secondary deterrent function.

Figure 2:
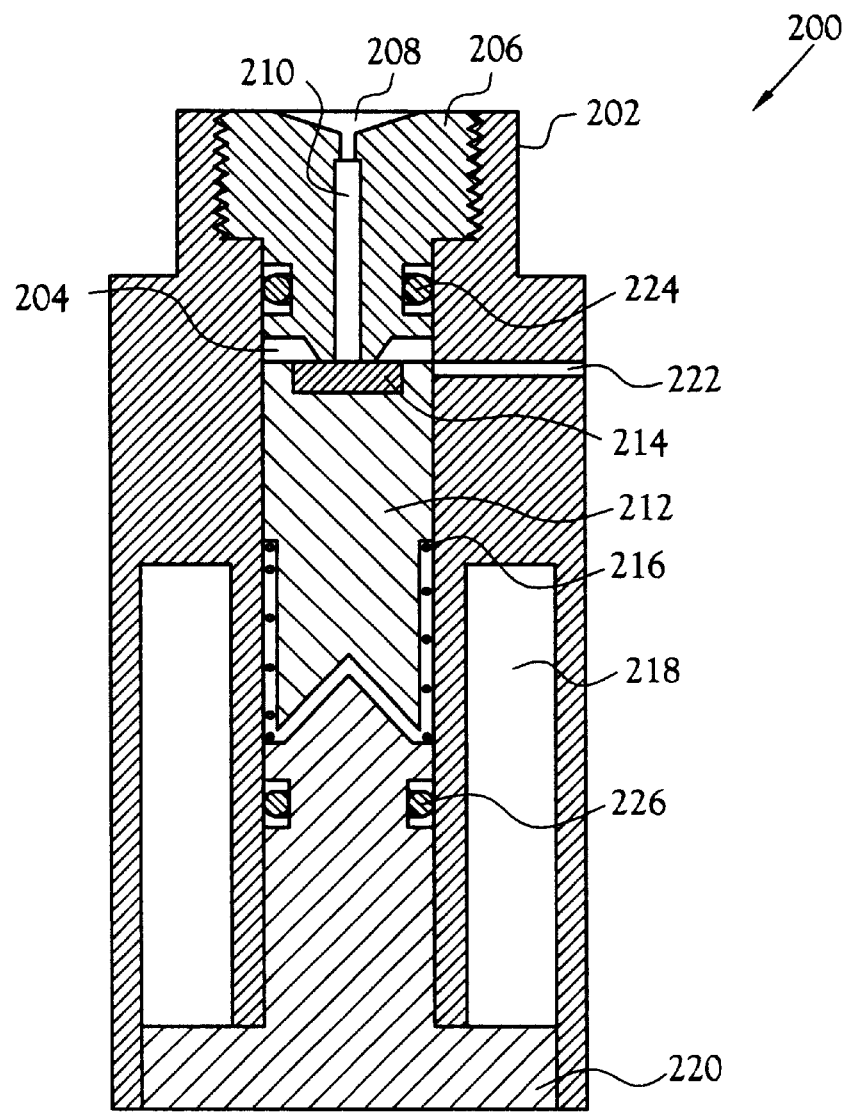
FIG. 2 illustrates, in partial section, the solenoid and valve assembly of the present invention.

FIG. 2 illustrates a sectional view of the solenoid and valve assembly 200 of the present invention. The solenoid and valve assembly includes a bobbin 202, which houses the solenoid components and serves as a stator. The bobbin 202 further defines an axial through opening 204 creating a volume for fluid transfer. A through opening 204 is threaded at one end and receives a threaded valve 206. Those skilled in the art will recognize that the valve can be secured to the bobbin 202 in other ways without departing from the scope and spirit of the present invention. For example, it is contemplated that the valve can be integrally formed with the bobbin or could be secured using solder, welds, crimps, set screws, or adhesives.

The valve 206 includes a valve output, or nozzle, 208 connected to a discharge channel 210 that opens to the internal volume of the bobbin 202. A plunger 212 rests in the through opening 204 below the valve 206. The plunger 212 includes a seal 214 configured to engage end of the discharge channel 210 that opens to the interior volume of the bobbin 202. The seal 214 is formed from a material that is flexible such that when the seal 214 is brought into engagement with the valve 206, the discharge channel 210 is effectively closed so that no fluid can escape through the valve 206. In the illustrated embodiment, the plunger 212 is shown in a closed position. A spring 216 biases the plunger 212 to maintain the closed position. To open the valve 206, the bias of the spring 216 is overcome using the solenoid by passing current through the windings 218. This creates an electromagnetic field that pulls the plunger 212 back against the stopper 220, thereby allowing the pressurized deterrent substance to enter the discharge channel 210 and escape through the valve 208.

The pressurized deterrent substance enters the volume of the bobbin 202 through inlet 222, which is open to the reservoir 112. In the illustrated embodiment, the inlet 222 appears to be partially blocked by the plunger 212; however, the present invention does not require that the inlet 222 be sealed. The solenoid and valve assembly 200 is designed such that the deterrent substance can fill the volume around the plunger and spring. A pair of gaskets 224, 226 forms the seal that limits the expansion of the deterrent substance and maintains the fluid pressure within the solenoid and valve assembly 200. Those skilled in the art will recognize that other configurations can be used without departing from the scope and spirit of the present invention.

Figure 3:
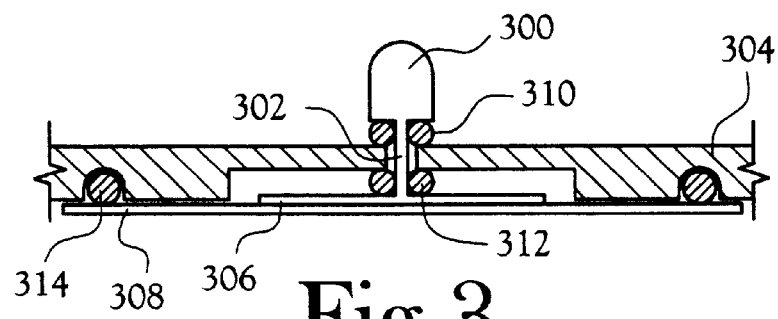
FIG. 3 illustrates, in partial section, the vibration sensor of the present invention.

FIG. 3 illustrates one embodiment of the vibration sensor 100 of the present invention. The vibration sensor 100 includes an exposed probe 300 adapted to engage the throat of the dog and move in response to vibrations of the dog's vocal chords. The probe 300 is mounted on a post 302 that passes through an opening defined by the case 304. Inside the case, the post connects to a transverse member 306 that is in engagement with a piezoelectric sensor 308. The vibration sensor 100 is designed with a plurality of gaskets 310, 312, 314 arranged to accomplish three goals. First, the outer gasket 310 and the inner gasket 312 serve to seal the case 304 and protect the internal components of the spray control bark sensor 10 from moisture and other environmental exposure where the post 302 passes through the wall of the case 304. Next, the outer gasket 310 and the inner gasket 312 serve to isolate the vibration sensor 100 from the case 304 to reduce the detection of vibrations transferred through the case 304 instead of the probe 300. Finally, the internal gasket 314 is positioned between the case 304 and the piezoelectric sensor 308 to amplify the sensitivity of the piezoelectric sensor 308.

Figure 4:
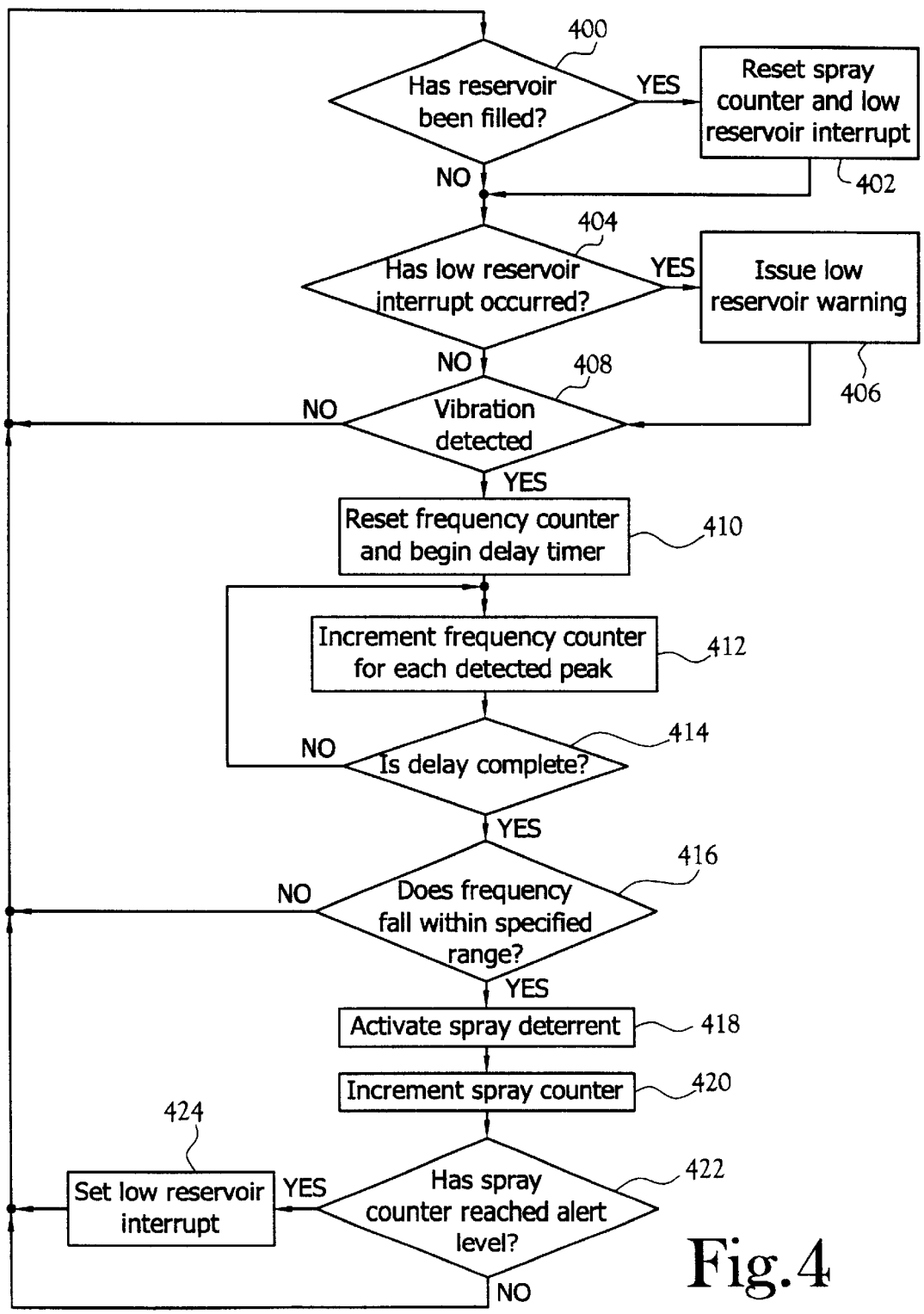
FIG. 4 illustrates a flow diagram of the method for gauging the amount of the deterrent substance remaining in the reservoir and for indicating when the reservoir needs to be refilled.

FIG. 4 illustrates a flow diagram of the method for producing a low spray warning. This feature is designed to give the pet owner a warning when the deterrent reservoir is getting low before the reservoir becomes empty. Obviously, if the reservoir is empty, then the spray control bark collar does not serve as an effective deterrent. The general method involves resetting a counter when the reservoir is filled. As the deterrent is applied, the counter is incremented until a threshold value is reached.

In step 400, the processor determines whether the reservoir has been filled. If the reservoir has been filled, then the spray counter and the low reservoir interrupt are reset in step 402. If the reservoir has not been filled, then the low reservoir interrupt is checked to determine if it is active in step 404. When the low reservoir interrupt is active, then the spray control bark collar alerts the pet owner that the reservoir is nearing empty, in step 406. Next, the spray control bark collar continues with its normal processing.

In step 408, the processor determines whether a vibration is detected. If no vibration is detected, the spray control returns to step 400 and continues monitoring the reservoir fill state. However, when a bark is detected, the processor measures the frequency of the detected vibration. In step 410, the frequency counter is reset and a timer is started. The frequency counter is incremented each time a peak occurs in the detected vibration signal, in step 412. When the timer expires, in step 414, the frequency is calculated based upon the number of peaks occurring during the measured time period, in step 416. Those skilled in the art will recognize that the method of measuring the frequency illustrated is one exemplary method and that other methods to determine the vibration frequency can be used without departing from the scope and spirit of the present invention.

Once the vibration frequency has been determined, the processor determines whether the frequency falls within a frequency range selected to represent the frequencies of a dog's bark. If the frequency is not in the proper range, it is assumed not to be a bark and the spray control bark collar returns to step 400 and continues monitoring the reservoir fill state. When a proper bark frequency is detected, the spray deterrent is activated in step 418. Next, the spray counter is incremented, in step 420, and the current value of the spray counter is checked to determine whether it has reached a reference or threshold value, in step 422. If the alert level has been reached, the low reservoir interrupt is set in step 424. Finally, the spray control bark collar returns to step 400 to process the reservoir fill state.

One simple method for determining the low reservoir threshold value is to fill the reservoir and activate the spray control bark collar until the reservoir is empty, while counting the number of deterrent sprays produced. This process can be repeated and the results averaged to produce a baseline for the reservoir capacity. Once the baseline value is established, the threshold value is selected a value less than the baseline value, for example a percentage of the baseline value. Those skilled in the art will recognize other methods and equipment that can be used to estimate the remaining deterrent substance level without departing from the spirit and scope of the present invention. For example, pressure sensitive switches or floats could be used to determine the reservoir fluid level.

Figure 5:
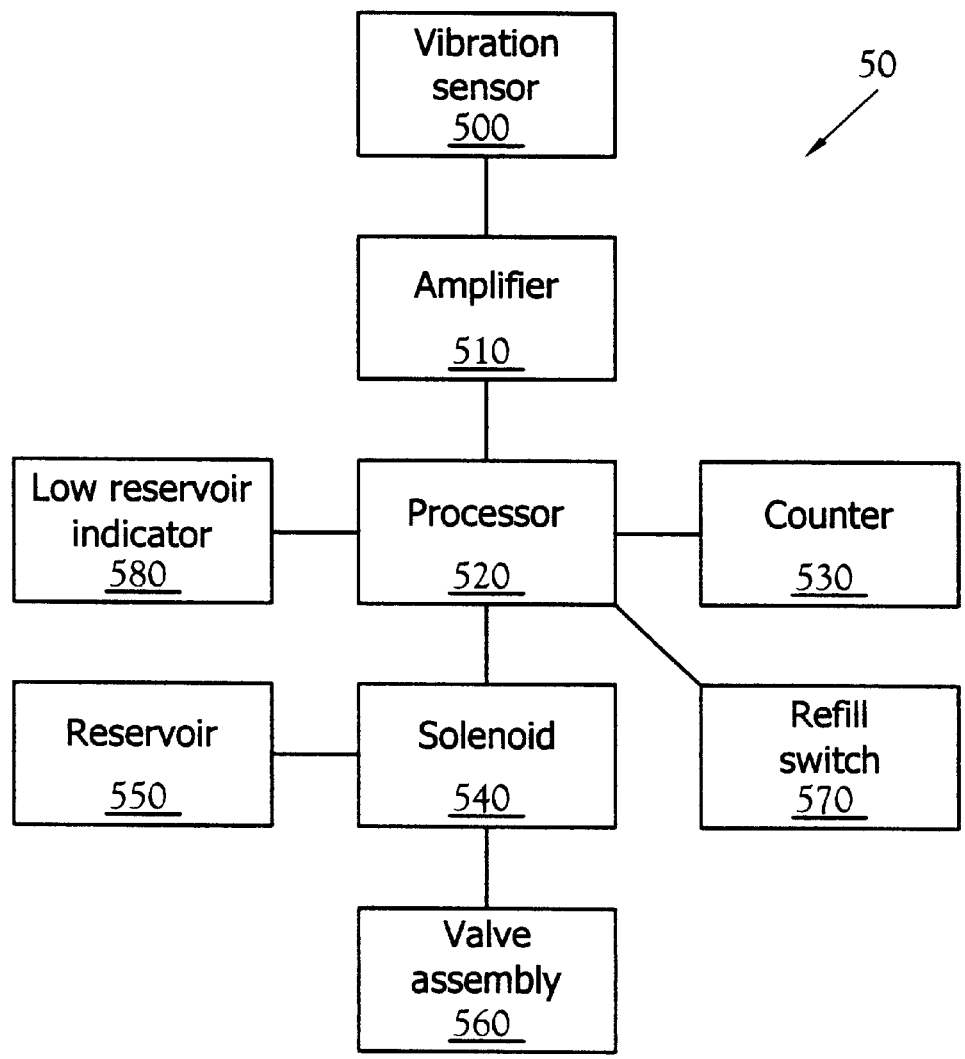
FIG. 5 illustrates a block diagram of an alternate embodiment of the spray control bark collar of the present invention that incorporates a low reservoir warning.

FIG. 5 illustrates another embodiment of the spray control bark collar 50 of the present invention incorporating the low spray warning feature. The spray control bark collar 50 includes a vibration sensor 500, an amplifier 510, a processor 520, a solenoid 540, a reservoir 550 and a value assembly 560. The low spray warning feature is implemented by adding a counter 530, a refill switch 570 and a low reservoir indicator 580, all in communication with the processor 520. Acting as a gauge, the processor tracks the number or the duration of the applications of the spray deterrent.

Those skilled in the art will recognize that refill switch 570 can be implemented in various ways without departing from the scope and spirit of the present invention. For example, the refill switch can be a magnetic reed switch or a push-button momentary switch. Further, refilling can be indicated by removing power from the spray control bark collar. In another implementation, the refill switch is implemented where the nozzle of the spray refill makes or breaks a connection when inserted into the reservoir refill inlet.

With regard to the counter 530, those skilled in the art will recognize that the timer can be implemented in the processor 520 or using a separate discrete component. The counter 530 can use count up or count down logic. Those skilled in the art will recognize that low reservoir indicator 580 can be implemented using a visual indicator, such as a light emitting diode, or an audible indicator. In a more sophisticated embodiment, the low reservoir warning can be remote from the collar and activated by a transmission from the spray control bark collar.

The spray control bark collar 10 of the present invention also includes a progressively increasing spray deterrent designed to discourage barking using the minimum amount of spray necessary to achieve the desired deterrent effect. Generally, the spray deterrent begins with a minimum dose of the substance applied to the dog in response to a bark. In the illustrated embodiment, the dosage is controlled by the duration the spray application. In one embodiment, the processor controls the timing and activates the solenoid 110 for the desired spray duration. Those skilled in the art will recognize that other methods for controlling the intensity of the spray deterrent are available, including changing the flow rate of the deterrent substance to increase the application amount applied during a fixed period.

Figure 6:
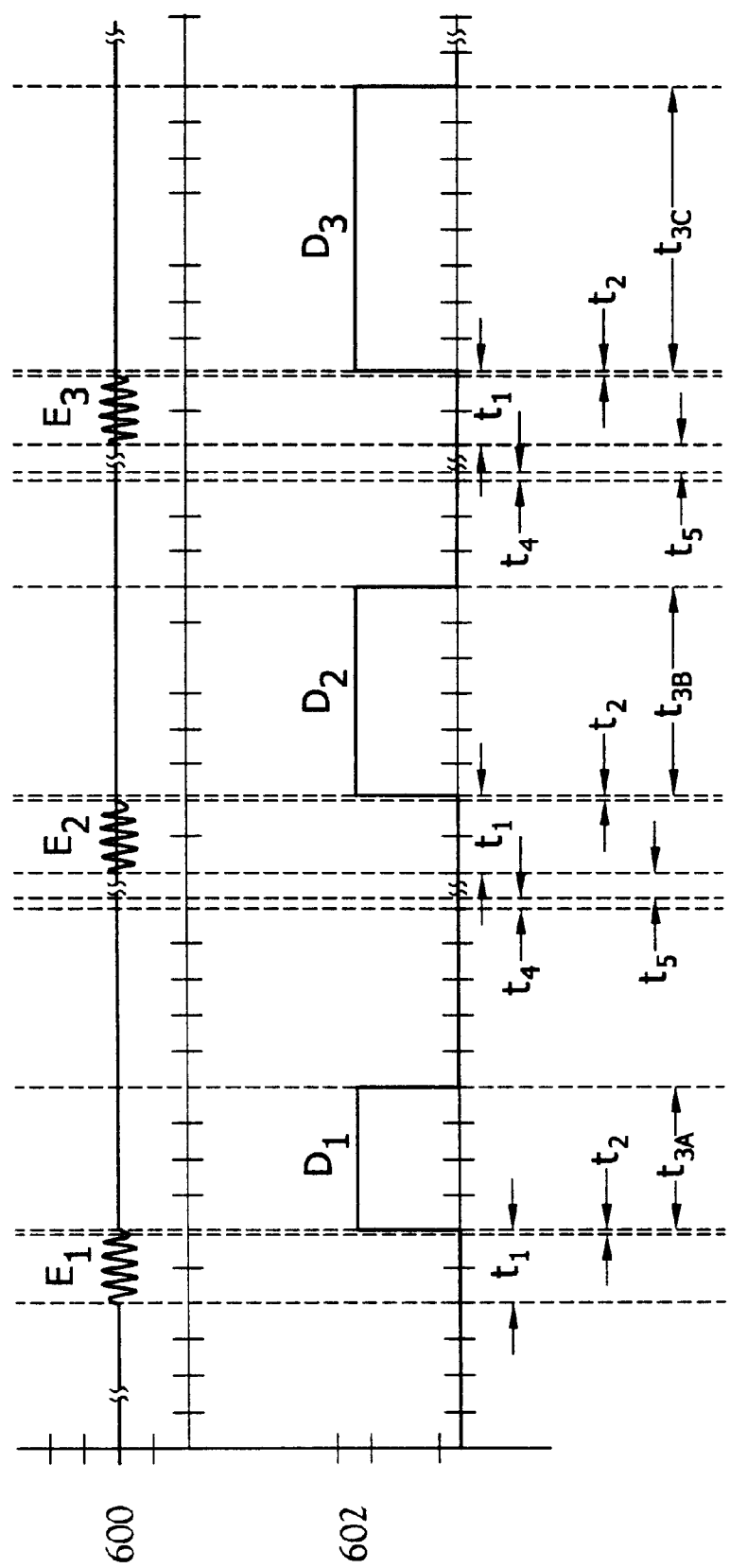
FIG. 6 illustrates a timing diagram showing the relation between the successive stimuli in an embodiment of the spray control bark collar that incorporates an adaptive deterrent feature.

FIG. 6 is a timing diagram showing the relation between the successive stimuli where the adaptive deterrent feature is used. Graph 600 shows the sensor output, which represents the detection events. Graph 602 illustrates the output of the stimulus generator in the form of a varying duration output that controls the operation of the solenoid. In the illustrated timing diagram, three detected events, $E_1$, $E_2$ and $E_3$, are shown. The time required to sample and measure the input signal is represented by period $t_1$. A deterrent signal control signal, $D_1$, $D_2$ and $D_3$, follows each detected event that meets predetermined criteria, which indicates that a response is necessary. In the illustrated embodiment, a time delay between sampling and the beginning of the deterrent signal control signal, represented by period $t_2$, is shown. Those skilled in the art will recognize that the time delay is not required by the present invention but may introduced as desired or as a result of characteristics or processing delays inherent in the components used to implement the apparatus. The duration of the deterrent signal is represented by period $t_{3A}$, $t_{3B}$, $t_{3C}$.

The intensity of each subsequent stimulus is greater than the preceding stimulus, as shown by the longer duration of the spray deterrent control signal. Those skilled in the art will recognize that, depending upon the activities of the animal, the objects of the electronic training device and the underlying training philosophy, the intensity of a given stimulus could be reduced from or remain constant with the intensity of the preceding stimulus. After each stimulus, the time delay that occurs before the next input signal can be sampled is represented by period $t_4$. Again, this delay is not required for proper operation, but may be introduced intentionally or through properties or limitations of the components used. When the system is ready to process a new input signal, a timer begins counting the time period, represented by the period $t_5$, between the end of the previous stimulus $D_1$, $D_2$, $D_3$ and the next detected event $E_1$, $E_2$, $E_3$. The length time between the previous event and the next subsequent event determines whether the intensity is increased or remains constant. In one embodiment, when the next subsequent event occurs within a predetermined period of time relative to the previous event, the reoccurrence period, the intensity of the stimulus is increased. This occurs because the rapid repetition of the undesired behavior indicates that the previous stimulus did not have sufficient intensity to deter the animal from continuing in the unwanted behavior. However, when the next subsequent event occurs after the expiration of the reoccurrence period, the intensity of stimulus remains at the prior intensity level.

Those skilled in the art will recognize that the training methodology defines the operation parameters of the spray control bark collar. As mentioned, the system generally increases the intensity each time a new event occurs within the reoccurrence period of the last event. However, the system can implement an adaptive correction scheme customized to a particular animal. For example, the system can reset to a baseline deterrent that is established for a particular animal by analyzing historical information as to the effective intensity level. Once the effective intensity level is known, the baseline is established relative to that level, perhaps one or more levels below the effective intensity level. Alternatively, the system may reset entirely if no events occur within a significant period of time. The choice of correction scheme can affect the hardware and software implementation of the apparatus but does not alter the underlying method of varying the intensity of the correction stimulus by changing the duty cycle of the correction signal applied over a fixed duration. Accordingly, any such modifications are considered to fall within the scope and spirit of the present invention.

When the adaptive spray feature is implemented in combination with the low reservoir monitor, a simple count of the number of deterrents applied is no longer effective in estimating the reservoir fill level. However, by modifying the low reservoir monitor to keep track of the total application time of the applied spray deterrents, the same result is achieved. In this case, the general counter 530 is replaced by a timer and the reservoir capacity is measured in spray time rather than unit sprays. When a selected value of the total available spray time elapses, the low reservoir warning is produced.

Those skilled in the art will recognize that timing decisions abound depending upon the objects of the training or containment system. As mentioned, one embodiment of the spray control bark collar 10 generally increases the dosage of the spray each time a new event occurs within the reoccurrence period of the last event. However, the system can implement an adaptive correction scheme customized to a particular animal. For example, the system can reset to a baseline deterrent that is established for a particular animal by analyzing historical information as to the effective spray dosage. Once the effective spray dosage is known, the baseline is established relative to that dose, perhaps one or more levels below the effective dose. Alternatively, the system may reset entirely if no events occur within a significant period of time. Accordingly, any such modifications are within the purview of those skilled in the art and are considered to fall within the scope and spirit of the present invention.

While one embodiment has been shown and described, the spray deterrent features described herein can be utilized in animal training or confinement applications beyond bark control. Either or both of the low reservoir warning and the variable intensity spray features can be used with a device employing a spray deterrent to achieve the desired product. Those skilled in the art will understand that it is not intended to limit the disclosure, but rather it is intended to cover all modifications and alternate methods falling within the spirit and the scope of the invention as defined in the appended claims.

Having thus described the aforementioned invention, we claim:

1. An apparatus for deterring a dog from barking, said apparatus comprising:
    a housing carried by the dog;
    a vibration sensor carried by said housing, said vibration sensor adapted to mechanically sense vibrations produced by the dog;
    a processor responsive to said vibration sensor, said processor generating an activation signal when said vibration is detected by said vibration sensor;
    a reservoir holding a substance used to deter the dog from barking; and
    a spray mechanism in communication with said reservoir and said controller, said spray mechanism delivering a dose of said substance to said dog upon receipt of said activation signal.

2. The apparatus of claim 1 wherein said vibration sensor includes a vibration probe in communication with a piezoelectric sensor, said vibration probe communicating vibrations produced by the dog to said piezoelectric sensor.

3. The apparatus of claim 2 wherein said piezoelectric sensor is mechanically insulated from said housing.

4. The apparatus of claim 2 wherein said vibration probe is mechanically insulated from said housing.

5. The apparatus of claim 1 wherein said processor determines when said vibrations produced by the dog are within a selected frequency range indicative of a bark.

6. The apparatus of claim 1 wherein said vibration sensor includes a filter adapted to pass said vibrations produced by the dog are within a selected frequency range indicative of a bark.

7. An apparatus for deterring a dog from barking, said apparatus comprising:
    means for sensing vibrations produced by the dog;
    means for classifying said vibrations occurring within a selected frequency range as a bark;
    means for storing a substance used to deter the dog from barking;
    means for dispensing said substance to the dog; and
    means for activating said means for dispensing said substance in response to said bark.

8. An apparatus for deterring a dog from barking, said apparatus comprising:
    a housing carried by the dog, said housing defining a through opening;
    a reservoir holding a substance used to deter the dog from barking;
    a post extending through said through opening, said post defining a first end external to said housing and a second end internal to said housing;
    a probe connected to said post first end;
    a transverse member connected to said post second end;
    a piezoelectric sensor in engagement with said transverse member, said piezoelectric sensor responsive to vibrations at said probe;
    at least one gasket disposed around said post proximate to said through opening for environmentally sealing said housing and for mechanically insulating said post from said housing;
    a processor responsive to said piezoelectric sensor, said processor generating an activation signal when a vibration is detected by said piezoelectric sensor;
    a spray mechanism in communication with said reservoir and said processor, said spray mechanism delivering a dose of said substance to said dog upon receipt of said activation signal.

9. The apparatus of claim 8 wherein said at least one gasket includes a gasket disposed between said probe and said housing.

10. The apparatus of claim 8 wherein said at least one gasket includes a gasket disposed between said housing and said transverse member.

11. The apparatus of claim 8 further comprising a gasket disposed between said housing and said piezoelectric sensor for mechanically insulating said piezoelectric sensor from said housing.

12. An apparatus for deterring a dog from barking, said apparatus comprising:
    a housing carried by the dog, said housing defining a through opening;
    a reservoir holding a substance used to deter the dog from barking;
    a post extending through said through opening, said post defining a first end external to said housing and a second end internal to said housing;
    a probe connected to said post first end;
    a transverse member connected to said post second end;
    a piezoelectric sensor in engagement with said transverse member, said piezoelectric sensor responsive to vibrations at said probe;
    a first gasket disposed between said probe and said housing;
    a second gasket disposed between said housing and said transverse member;
    a third gasket disposed between said housing and said piezoelectric sensor;
    a processor responsive to said piezoelectric sensor, said processor generating an activation signal when a vibration is detected by said piezoelectric sensor;
    a spray mechanism in communication with said reservoir and said processor, said spray mechanism delivering a dose of said substance to said dog upon receipt of said activation signal.

13. The apparatus of claim 12 wherein said first gasket and said second gasket are disposed around said post at said through opening to environmentally seal said housing.

14. The apparatus of claim 12 wherein said first gasket and said second gasket mechanically insulate said piezoelectric sensor from said housing.

15. The apparatus of claim 12 wherein said third gasket mechanically insulates said piezoelectric sensor from said housing.

16. An apparatus for deterring a dog from barking, said apparatus comprising:

a housing carried by the dog;

a vibration sensor carried by said housing, said vibration sensor detecting vibrations produced by the dog that are indicative of a bark;

a processor responsive to said vibration sensor, said processor generating an activation signal when said vibration is detected by said vibration sensor;

a reservoir for holding a substance used to deter the dog from barking;

a bobbin defining an internal volume, said bobbin in fluid communication with said reservoir;

a nozzle for directing a dose of said substance to the dog;

a discharge channel having a first end connected to said nozzle and a second end open to said bobbin internal volume, said discharge channel providing fluid connection between said bobbin internal volume and said nozzle;

a solenoid responsive to said activation signal, said solenoid having a plunger adapted to engage said discharge channel second end to make and break a fluid seal with said discharge channel second end; and a spring member in communication with said plunger, said spring member biasing said plunger toward said discharge channel second end;

whereby said solenoid overcomes said spring to allow delivery of a dose of said substance to the dog upon receipt of said activation signal.

17. An apparatus for deterring a dog from barking, said apparatus comprising:

a housing carried by the dog;

a vibration sensor carried by said housing, said vibration sensor including a vibration probe in communication with a piezoelectric sensor, said vibration probe communicating vibrations produced by the dog to said piezoelectric sensor;

a processor responsive to said vibration sensor, said processor generating an activation signal when said vibration is detected by said vibration sensor;

a reservoir holding a substance used to deter the dog from barking; and a spray mechanism in communication with said reservoir and said controller, said spray mechanism delivering a dose of said substance to said dog upon receipt of said activation signal.

18. The apparatus of claim 17 wherein said piezoelectric sensor is mechanically insulated from said housing.

19. The apparatus of claim 17 wherein said vibration probe is mechanically insulated from said housing.

20. The apparatus of claim 17 further comprising means for mechanically isolating said vibration probe from said housing.

* * * * *

UNITED STATES PATENT AND TRADEMARK OFFICE
Certificate

Patent No. 6,668,760 B2                                                                 Patented: December 30, 2003

On petition requesting issuance of a certificate for correction of inventorship pursuant to 35 U.S.C. 256, it has been found that the above identified patent, through error and without any deceptive intent, improperly sets forth the inventorship.
  Accordingly, it is hereby certified that the correct inventorship of this patent is: William S. Groh, Knoxville, TN (US); Albert L. Lee, IV, Maryville, TN (US); and Frank H. Speckhart, Knoxville, TN (US).

Signed and Sealed this Nineteenth Day of October 2010.

MICHAEL R. MANSEN
*Supervisory Patent Examiner*
Art Unit 3654
Technology Center 3600